Figure 1:
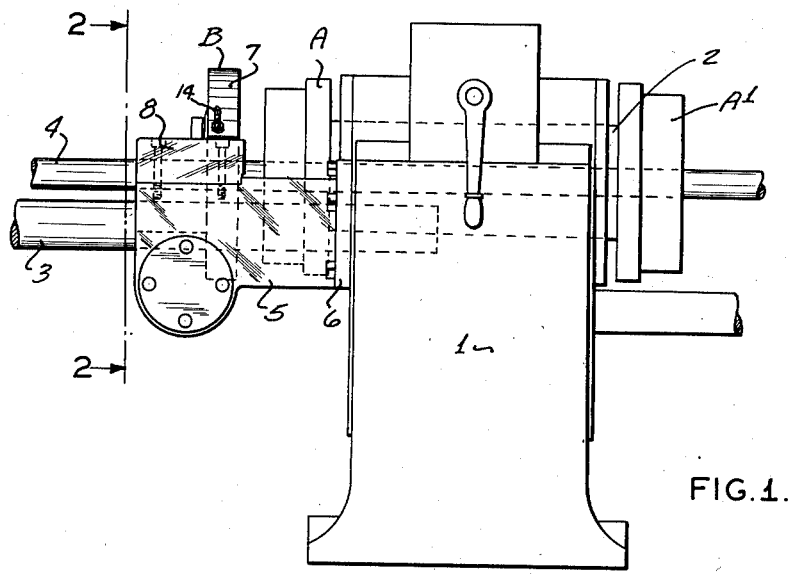

May 13, 1952 W. SIEGERIST 2,596,444
TURNING MACHINE
Filed March 21, 1946 2 SHEETS—SHEET 1

INVENTOR:
Walter Siegerist,
by Carr Parr & Gravely,
HIS ATTORNEYS.

May 13, 1952 W. SIEGERIST 2,596,444
TURNING MACHINE
Filed March 21, 1946 2 SHEETS—SHEET 2
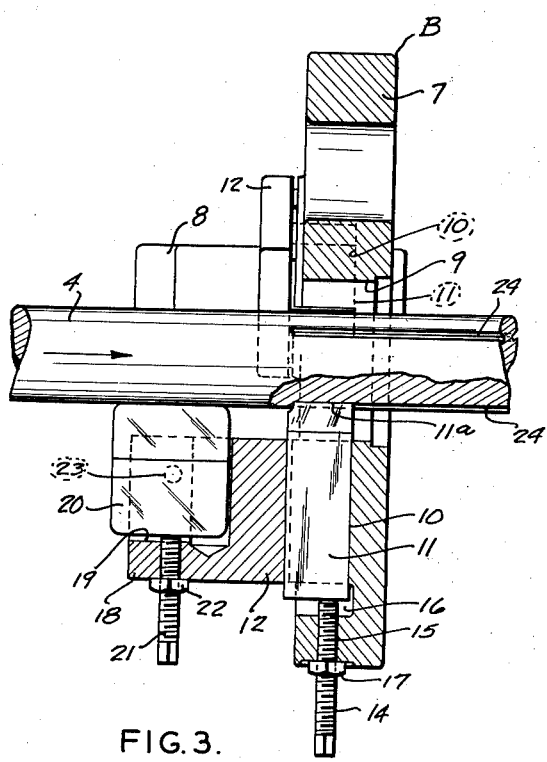
FIG. 3.
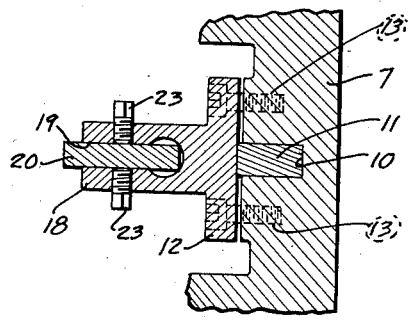
FIG. 4.
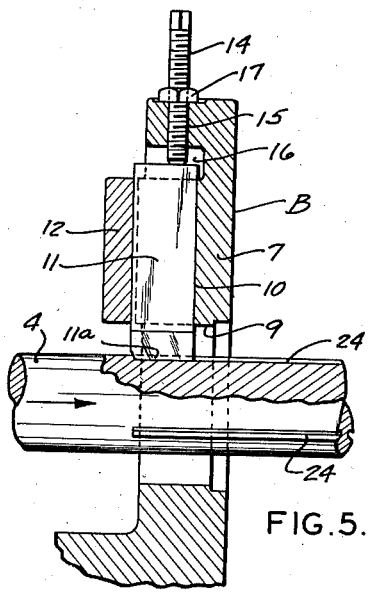
FIG. 5.
FIG. 6.
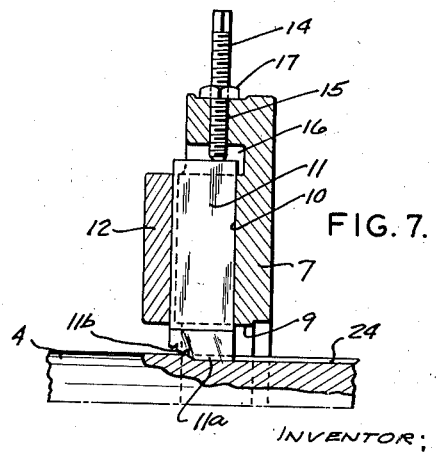
FIG. 7.
INVENTOR:
Walter Siegerist,
by Carr Harr & Gravely,
HIS ATTORNEYS.

Patented May 13, 1952

2,596,444

UNITED STATES PATENT OFFICE 2,596,444

TURNING MACHINE

Walter Siegerist, University City, Mo.

Application March 21, 1946, Serial No. 655,996

7 Claims. (Cl. 82—20)

This invention relates to machines for turning and finishing long rod or tube stock of circular section, and more particularly to centerless turning machines of the type wherein such stock is held against rotation on a grip carriage and is fed thereby axially through a hollow rotary cutter-head. In this type of turning machine, the grip carriage is located a considerable distance from the rotary cutter-head and this distance is a maximum when the carriage starts its feeding movement. Therefore, there is a tendency for the portion of the work between the grip carriage and the rotary cutter-head to twist due to the torque imposed on the work by the rotating cutter-head and thus set up vibrations which result in chatter marks on the surface of the work and possible damage to the machine. Long thin chip-sections also increase the danger of chatter and are dangerous to the operator and inconvenient to dispose of in the machine.

The principal object of the present invention is to prevent the work from twisting or rotating due to the torque imposed thereon by the rotary cutter-head and thus eliminate the chattering hereinbefore referred to. Another object is to provide for treatment of the work by the anti-torque device so that the chips produced by the rotary cutter-head will break off in relatively short lengths and thus further reduce the danger of chatter and prevent choking of the chip cleaner spaces in the machine and injury to the operator thereof. Other objects are to provide for supporting and feeding the work to the rotary cutter-head concentric therewith and to provide for simplicity and cheapness of construction, compactness of design and easy assembly and disassembly of the parts.

The invention consists principally in mounting on the machine adjacent to the work entering end of the rotary cutter-head thereof a stationary cutter-head which is adapted to produce longitudinal grooves in the peripheral surface of the work during the axial feed thereof through said stationary cutter-head to said rotary cutter-head, whereby the work grooving tools of the stationary cutter-head prevent rotation of the work under the torque of the rotary cutter-head and the longitudinal peripheral grooves in the work cause the portions thereof removed by the rotary cutter-head to break off in relatively short chips. The invention also consists in arranging the stationary cutter-head so that it centers the work concentric with the rotary cutter-head; it also consists in providing for adjusting the stationary cutter-head so as to vary the depth of the longitudinal peripheral grooves formed thereby; and it also consists in the parts and combinations and arrangements of parts hereinafter described and claimed.

Figure 2:
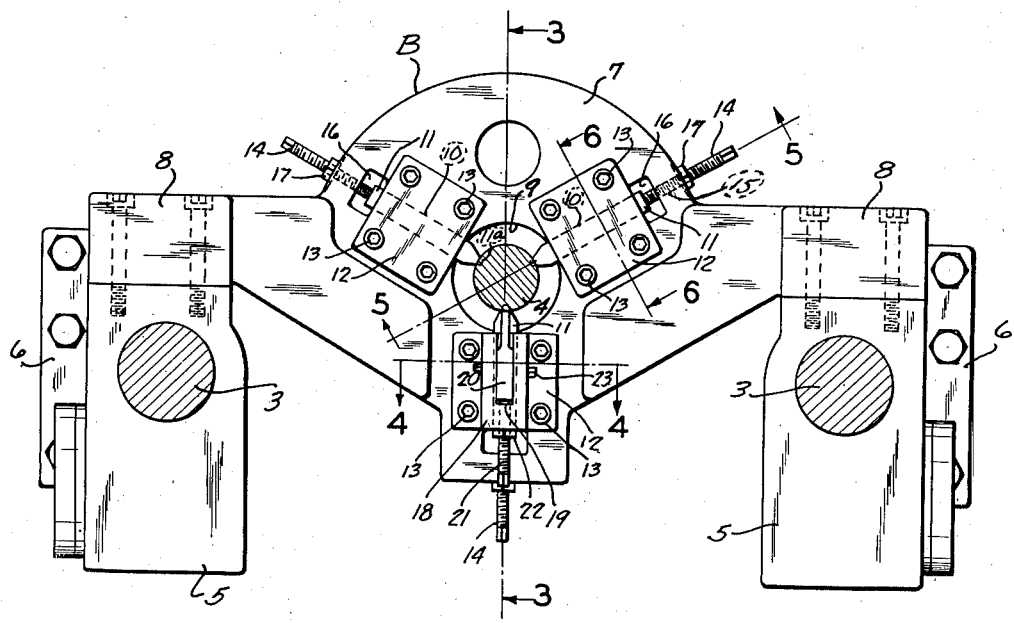

In the accompanying drawings, which form part of this specification and wherein like symbols refer to like parts wherever they occur, Fig. 1 is a side elevational view of a portion of a turning machine embodying my invention, Fig. 2 is an enlarged vertical cross-sectional view on the line 2—2 in Fig. 1, Fig. 3 is a vertical longitudinal sectional view on the line 3—3 in Fig. 2, Fig. 4 is a fragmentary horizontal sectional view on the line 4—4 in Fig. 2, Fig. 5 is a fragmentary sectional view on the line 5—5 in Fig. 3, Fig. 6 is a fragmentary sectional view on the line 6—6 in Fig. 3; and Fig. 7 is a fragmentary sectional view similar to Fig. 5, showing a modification of the invention.

In the accompanying drawings, my invention is shown embodied in a machine for turning long rod or tube stock of circular section. Said turning machine, of which only a portion is shown, comprises a housing 1, a hollow power driven spindle 2 extending horizontally through said housing, and hollow cutter-heads A and A¹ secured respectively to the projecting input and output ends of said spindle for rotation therewith. In accordance with common practice, gearing (not shown) is located in the housing 1 for driving the tubular spindle 2 journaled therein, and grip carriages (not shown) are slidably supported on horizontal rails or runner bars 3 for feeding the work 4 axially through said spindle and the hollow cutter-heads A and A¹ rotatable therewith. The turning machine thus far described is well known and it is considered unnecessary to illustrate it in detail.

Sleeved on the carriage supporting rails or runner bars 3 on the input side of the drive housing 1 are tubular brackets 5 having outstanding end flanges 6 that are rigidly secured flatwise to said side of said housing. Spanning the two brackets 5 is a stationary cutter-head B comprising a vertically disposed plate-like body portion 7 having widened end portions 8 that seat on and are removably secured to said brackets directly above the supporting rails 3 therefor. The body portion 7 of the stationary cutter-head B is located opposite and adjacent to the rotary input cutter-head A; and said body has a central circular work receiving opening 9 extending horizontally therethrough in axial alinement with said input cutter-head.

The body portion 7 of the stationary cutterhead B has a circular series of circumferentially spaced grooves 10 in the front face thereof that are disposed radially of and open into the central circular work receiving opening 9 in said body. Mounted in said grooves for longitudinal sliding movement therein radially of the work receiving opening 9 are tools 11 whose inner ends are beveled to provide chisel-shaped cutting edges 11a that extend side edge to side edge of said tools parallel to the axis of said work receiving opening. The tools 11 are clamped to the bottoms of their supporting grooves 10 by means of plates 12 that seat flatwise against the exposed outside edges of said tools and are secured by screws 13 flatwise to the body portions 7 of the stationary cutter-head on opposite sides of said grooves.

The cutting tools 11 are adjusted longitudinally of their supporting grooves 10 in the direction of the axis of the work receiving opening 9 in the body 7 of the stationary cutter-head B preferably by means of screws 14 and are threaded through threaded holes 15 provided therefor in the peripheral edge of said body opposite the outer ends of the cutting tools. The screw holes 15 open into openings 16 formed in the body 7 opposite the outer ends of the cutting tools 11; and the inner ends of the adjusting screws 14 extend into said openings and abut against the outer ends of said cutting tools. The tool adjusting screws 14 are provided with nuts 17 that are adapted to bear against the peripheral edge of the body 7 and thus lock said screws in the desired portion of adjustment. By this arrangement, the cutting tools 11 may be moved radially inwardly of the work receiving opening 9 in the body 7 of the stationary cutter-head B by tightening the adjusting screws 14, while the plates 12 serve to clamp said tools in their supporting grooves 10.

As shown in the drawing, one of the radially disposed cutting tools 11 of the stationary cutter-head B is disposed lowermost and in a vertical plane; and the clamping or retaining plate 12 for said tool has an outstanding horizontal extension 18 on its front face. This forwardly extending portion 18 of the lowermost tool retaining plate 12 has a vertically disposed upwardly opening horizontal channel 19 therein that is disposed in the plane of the axis of the work receiving opening 9 in the body 7 and is adapted to receive and support a plate 20 which serves to support and guide the work 4 from below as it is fed axially through the stationary cutterhead. The work support and guide plate 20 is adjusted vertically in its supporting channel 19 by means of an adjusting screw 21 which is screwed upwardly through the extension 18 of the lowermost tool clamping plate 12 with its upper end disposed in said channel in abutting relation to the underside of said plate. The adjusting screw 21 is locked in the desired position of adjustment by means of a nut 22 that is threaded thereon in abutting relation with the underside of the extension 18 of the tool retaining plate; and the guide plate 20 is locked in the desired position of vertical adjustment by means of set screws 23 that are threaded horizontally into the extension 18 from opposite sides thereof into abutting relation with the side of said guide plate.

By the arrangement described, the work 4 is fed axially through the stationary and rotary cutter-heads in the manner hereinbefore described, and the cutting tools 11 of the stationary cutter-head are adjusted so as to produce three more or less equally spaced longitudinal grooves 24 in the peripheral surface of said work as it passes through the stationary cutter-head, the depth of such grooves being equal to or slightly less than the material that is removed from the work by the rotary cutter-heads. The cutting edges 11a of the stationary grooving tools 11 snugly fit the longitudinal grooves 24 formed thereby in the work as it passes through the stationary cutter-head and thus overcome the tendency for the work to twist or rotate due to the torque imposed thereon by the rotary cutter-heads, thereby preventing the work from vibrating and causing chatter marks thereon and damage to the machine. At the same time, the longitudinal peripheral grooves 24 in the work cause chips produced by the rotary cutter-heads to break off in relatively short lengths, thus further reducing the danger of chatter and preventing choking of the chip cleaner space in the machine. The grooving tools 11 may be readily adjusted for work of different diameters and to vary the depth of the longitudinal peripheral grooves 24 produced in the work in accordance with the amount of material removed therefrom by the rotary cutter-heads; and the work rest or supporting plate 20 may also be adjusted for work of different diameters. This independent adjustment of the grooving tools 11 and the work rest 20 permits work of different diameters to be positioned in axial alinement with the rotary cutter-heads, whereby the cut made by the rotary cutter-heads will always be of uniform depth and concentric with the original surface of the work. As shown in Fig. 7, the work grooving tools 11 may be beveled, as at 11b, at their forward corners of their cutting edges 11a so as to guide and center the work between said cutting edges.

Obviously, the hereinbefore described turning machine admits of considerable modification without departing from the invention. Therefore, I do not wish to be limited to the precise arrangements shown and described.

What I claim is:

1. In a turning machine having a hollow positively rotated cutter-head for turning work fed axially therethrough, the combination of a stationary cutter-head comprising a body having an opening therethrough through which said work is axially fed in advance of said positively rotated cutter-head, and a plurality of tools fixed to said body radially of the opening therethrough, said tools having cutting edges disposed in said opening to produce in the outer peripheral surface of said work during the axial feed of said work to and the operation thereon by said positively rotated cutter-head a plurality of continuous circumferentially spaced longitudinal grooves of a depth corresponding substantially to the amount of material removed from said work by said positively rotated cutter-head, each of said tools having an extension rearwardly of the cutting edge disposed in the grooves for preventing rotation of the work, whereby the engagement of said cutting edges of said fixed tools with said work prevents rotation thereof under the torque imposed thereon by said positively rotated cutter-head and said longitudinal grooves in said work cause the portions removed therefrom by said positively rotated cutter-head to break off in relatively short chips of a length corresponding substantially to the circumference of said work divided by the number of longitudinal grooves therein.

2. In a turning machine having a hollow positively rotated cutter-head for turning work fed axially therethrough, the combination of a stationary cutter-head mounted in said machine opposite the input end of said positively rotated cutter-head, said stationary cutter-head having an opening therethrough through which said work is axially fed to said positively rotated cutter-head, a plurality of tools secured to said stationary cutter-head radially of the opening therethrough and having cutting edges disposed in said opening to produce in the outer peripheral surface of said work during the axial feed of said work to and the operation thereon by said positively rotated cutter-head a plurality of continuous circumferentially spaced longitudinal grooves of a depth corresponding substantially to the amount of material removed from said work by said positively rotated cutter-head whereby the engagement of said cutting edges of said tools with said work prevents rotation thereof under the torque imposed thereon by said positively rotated cutter-head and said longitudinal grooves in said work cause the portions removed therefrom by said positively rotated cutter-head to break off in relatively short chips of a length corresponding substantially to the circumference of said work divided by the number of longitudinal grooves therein, means for adjusting each of said tools radially of said opening in said stationary cutter-head to vary the depth of the longitudinal grooves, means for locking each of said tools in the desired position of radial adjustment, and means mounted on the locking means for one of said tools for supporting and guiding said work in advance of said tools.

3. A turning machine comprising a positively rotatable turning tool which rotates about the axis of an elongated cylindrical axially fed work piece for turning the outer peripheral surface thereof; and a non-rotatable tool having an elongated portion extending rearwardly of the cutting edge thereof, the non-rotatable tool cutting an elongated peripheral axial groove in the work piece in advance of the positively rotatable turning tool during the axial movement of the work piece, the non-rotatable tool cutting a groove of a depth substantially equal to the depth of the cut of the positively rotatable turning tool, the rearwardly extending portion of said non-rotatable tool disposed in said groove for preventing rotation of said work piece by said turning tool by reason of the shear area of the non-rotatable tool and the work piece creating a resistance to shearing greater than the torque imposed on the work piece by the rotatable turning tool, the elongated groove in said work piece causing the portion removed by the rotatable turning tool to break off in chips having a length less than the circumference of the work piece.

4. A turning machine comprising a positively rotatable cutter head for machining the peripheral surface of an elongated cylindrical work piece axially fed through the cutter head; and a non-rotatable tool for cutting a longitudinally extended peripheral surface groove in the work piece in advance of said rotatable cutter head during the axial movement of the work piece therethrough, the longitudinal surface groove having a depth substantially equal to the depth of the cut of the rotatable cutter head, the non-rotatable tool having an elongated portion extending rearwardly of the cutting edge thereof disposed in and movable in said groove for increasing the shearing area of the non-rotatable tool with respect to the work piece and preventing rotation of said work piece by creating a resistance to shearing greater than the torque action of the rotatable cutter on the work piece, the longitudinal grooves in the work piece causing the portion removed by the turning operation to break off in lengths less than the circumference of the work piece.

5. A machine for removing surface metal from cylindrical bar stock comprising a hollow rotatable cutter head through which the work piece passes axially for removing surface material therefrom, a hollow cutter head located ahead of said rotatable cutter head and through which the work piece is axially moved; and a stationary cutter in said hollow cutter head having an elongated portion extending rearwardly of the cutting edge, said stationary cutter forming an axial groove in the surface of the bar stock of a depth substantially equal to the depth of the cut made by the rotatable cutter head, the extended portion of the stationary cutter disposed in said groove and forming a shearing area with respect to the work piece that creates a resistance to shearing in excess of the torque created by the rotatable cutter head for preventing rotation of the work piece, said longitudinal groove in the bar stock causing the portion removed by the rotatable cutter head to break off in lengths less than the circumference of the bar stock.

6. A machine for removing surface material from elongated cylindrical work pieces comprising a rotatable cutter head through which the work piece is fed axially, a hollow stationary cutter head mounted on the machine ahead of the rotatable cutter head and through which the work piece passes; and a plurality of stationary cutters clamped in said stationary cutter head and uniformly spaced about the work piece, each cutter having an elongated portion extending rearwardly of the cutting edge, said stationary cutters cutting grooves in the peripheral surface of the work piece as it passes through the stationary cutter head, the grooves having a depth substantially equal to the depth of the cut made by the rotatable cutter head, the elongated portion of each stationary cutter disposed in the grooves and forming a shearing area with respect to the work piece that creates a resistance to shearing in excess of the torque of the rotatable cutter head on the work piece for preventing rotation thereof, the longitudinal grooves in the work piece causing the portions removed by the rotatable cutter head to be broken into lengths substantially equal to the circumferential distance between the grooves in the work piece.

7. A machine for removing surface material from elongated cylindrical work pieces comprising a rotatable cutter head through which the work piece is axially fed, a stationary cutter head which includes a body having an opening through which the work piece is fed in advance of its passage through the rotatable cutter head, and a plurality of cutting tools disposed radially of said opening, each tool having a cutting edge and an elongated portion extending rearwardly of the cutting edge, said stationary cutters forming a plurality of grooves in the surface of the work piece as it is fed through said opening and having a depth substantially equal to the depth of the cut to be made by the rotatable cutter head, the elongated portion of each of said cutting tools lying in the grooves and forming a shearing area with the work piece that creates a resistance to shearing in excess of the force created by the torque of the rotatable cutter head on the work piece for preventing rotation of the work piece, the grooves causing the portion removed by the rotatable cutter head to be broken into lengths substantially equal to the circumferential distance between the grooves in the work piece.

WALTER SIEGERIST.

REFERENCES CITED

The following references are of record in the file of this patent:

UNITED STATES PATENTS

| Number | Name | Date |
|---|---|---|
| 1,585,824 | Bertstrom | May 25, 1926 |
| 1,797,944 | Dustan | Mar. 24, 1931 |
| 2,051,086 | Johnson | Aug. 18, 1936 |
| 2,201,173 | Hanitz | Mar. 21, 1940 |
| 2,383,165 | Schuyler | Aug. 21, 1945 |
| 2,389,556 | Siegerist | Nov. 20, 1945 |